(12) United States Patent  
Ross

(10) Patent No.: US 8,792,777 B2  
(45) Date of Patent: Jul. 29, 2014

(54) ACCURATE FAST FORWARD RATE WHEN PERFORMING TRICK PLAY WITH VARIABLE DISTANCE BETWEEN FRAMES

(75) Inventor: Tim Ross, Bedford, NH (US)

(73) Assignee: Broadcom Corporation, Irvine, CA (US)

( * ) Notice: Subject to any disclaimer, the term of this patent is extended or adjusted under 35 U.S.C. 154(b) by 1722 days.

(21) Appl. No.: 11/621,764

(22) Filed: Jan. 10, 2007

(65) Prior Publication Data

US 2008/0166100 A1   Jul. 10, 2008

(51) Int. Cl.
```
H04N 5/783    (2006.01)
H04N 5/78     (2006.01)
H04N 5/935    (2006.01)
H04N 9/80     (2006.01)
G06F 3/00     (2006.01)
G10L 21/00    (2013.01)
G11B 5/09     (2006.01)
```

(52) U.S. Cl.
USPC ........... 386/343; 386/211; 386/214; 386/217; 386/220; 386/239; 386/314; 386/345; 386/347; 348/731; 369/47.1; 369/47.19; 369/59.1; 704/208; 704/211; 704/214; 704/503; 715/720; 725/38

(58) Field of Classification Search
USPC ........... 386/343, 314, 32, 347, E5.0529, 239, 386/220, 211, 214, 217, E5.052, 345; 348/E5.008, 731; 375/E7.017, E7.022, 375/E7.151, E7.179, E7.211, E7.22, 375/E7.004; 369/47.1, 47.19, 59.1; 704/208, 211, 214, 503; 715/203, 720; 725/38, 100; 370/232, 235, 236, 389, 370/474; 455/69, 88; 709/203, 232, 233, 709/234, 235

See application file for complete search history.

(56) References Cited

U.S. PATENT DOCUMENTS

| | | | | | |
|---|---|---|---|---|---|
| 6,057,832 | A | * | 5/2000 | Lev et al. | 715/720 |
| 7,068,915 | B1 | * | 6/2006 | Cho | 386/220 |
| 7,412,149 | B2 | * | 8/2008 | Cohen et al. | 386/343 |
| 7,508,760 | B2 | * | 3/2009 | Akiyama et al. | 370/232 |
| 7,693,398 | B2 | * | 4/2010 | Kanemaru et al. | 386/239 |
| 7,840,119 | B2 | * | 11/2010 | Eifrig et al. | 386/329 |
| 2002/0015576 | A1 | * | 2/2002 | Gordon et al. | 386/68 |

* cited by examiner

*Primary Examiner* — Daquan Zhao
*Assistant Examiner* — Syed Hasan
(74) *Attorney, Agent, or Firm* — Foley & Lardner LLP

(57) ABSTRACT

The present invention is directed to system(s), method(s), and apparatus for accurate fast forward rate when performing trick play with variable distance between frames. In one embodiment, there is presented a circuit for providing a fast forward video sequence. The circuit comprises a system time clock for providing a time reference, said time reference incremented at a predetermined fast forward rate; a comparator for comparing the time reference with timing information associated with a picture; and a controller for determining whether to display the picture based at least in part on the comparison between the timing information and the time reference.

21 Claims, 4 Drawing Sheets

ACCURATE FAST FORWARD RATE WHEN PERFORMING TRICK PLAY WITH VARIABLE DISTANCE BETWEEN FRAMES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video decoders often cannot decode all of the pictures in a compressed stream quickly enough to perform fast forward. Parsing the stream to extract the I frames and feeding only the I frames to the decoder and repeating display of the I frame a specific number of times relies on the assumption that the frequency of I frames is constant.

Further limitations and disadvantages of conventional and traditional approaches will become apparent to one of skill in the art, through comparison of such systems with embodiments presented in the remainder of the present application with references to the drawings.

BRIEF SUMMARY OF THE INVENTION

The present invention is directed to system(s), method(s), and apparatus for accurate fast forward rate when performing trick play with variable distance between frames as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
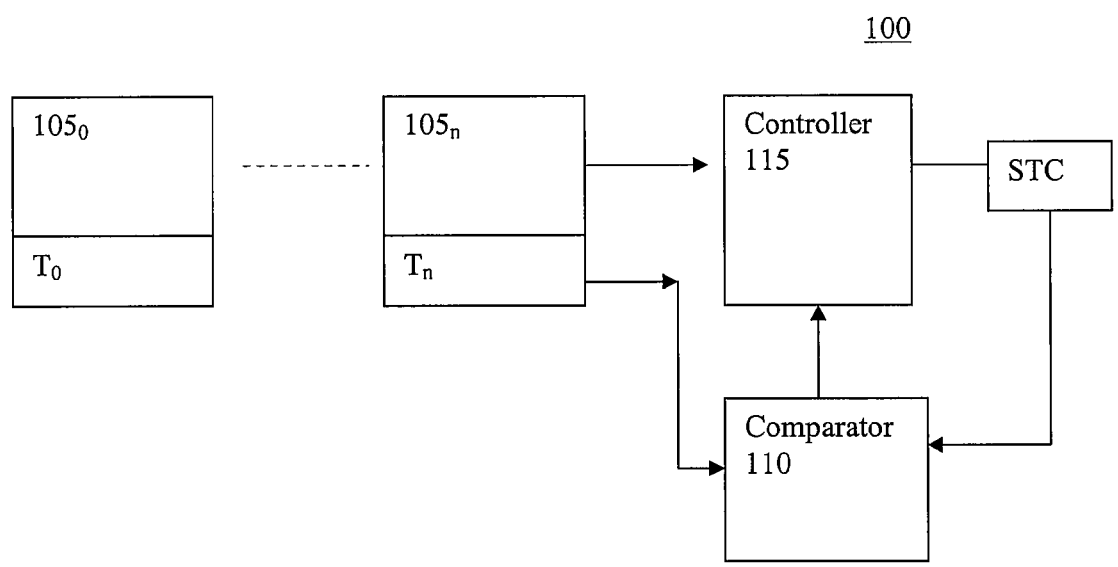
FIG. 1 is a block diagram of an exemplary circuit in accordance with an embodiment of the present invention.

Referring now to FIG. 1, there is illustrated a block diagram of an exemplary circuit for providing a fast forward video sequence. The circuit 100 receives video data. The video data comprises a series of pictures $105_0 \ldots 105_n$. The pictures $105_0 \ldots 105_n$ can be compressed or not compressed. The pictures $105_0 \ldots 105_n$ are each associated with timing information $T_0 \ldots T_n$ that indicates the time for the display of the associated picture. When the pictures 105 are displayed at their particular time indicated in the timing information T, motion picture is simulated.

The circuit 100 comprises a system time clock STC, a comparator 110, and a controller 115. The system time clock 105 provides a local time reference. The comparator 110 compares the time reference provided by the system time clock 105 with the timing information T associated with pictures 105. Based on the comparisons between the time reference and the timing information, the controller 115 can determine the particular picture 105 to display.

The circuit 100 can provide a fast forward video sequence by incrementing the system time clock 105 by a fast forward factor. For example, where the system time clock 105 increments based on clock cycles, the system time clock 105 can increment by the product of the increment step and the fast forward factor. For example, to fast forward at a rate of 10×, the system time clock 105 can increment at 10 times the increment step.

Certain embodiments of the present invention can be used alongside a variety of different video compression standards. For example, in an exemplary case, the present invention can be used with video data that is compressed in accordance with one of the video compression standards promulgated by the Motion Picture Experts Group (MPEG).

Figure 2:
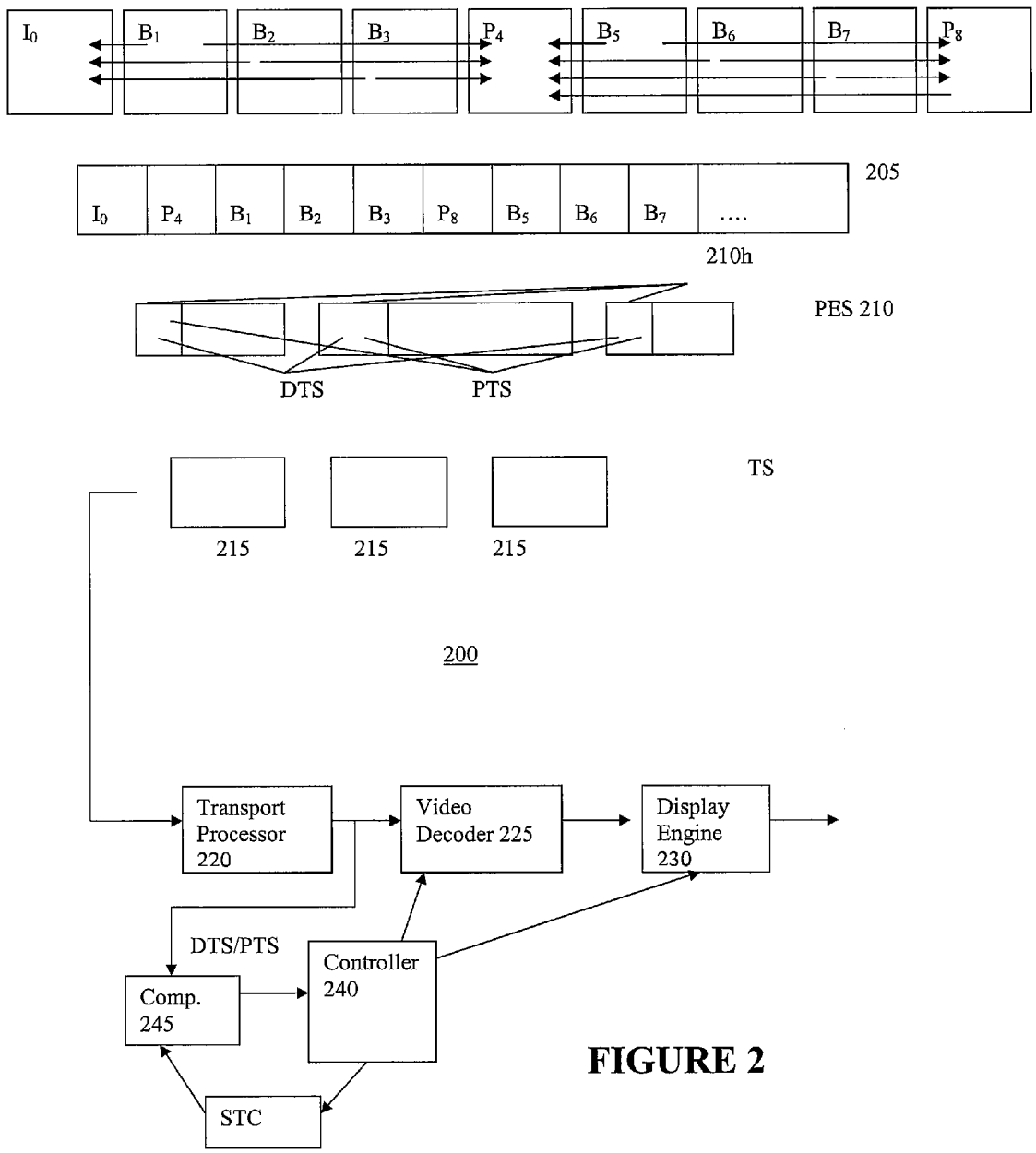
FIG. 2 is a block diagram of an exemplary circuit in accordance with another embodiment of the present invention.

Referring now to FIG. 2, there is illustrated a block diagram of an embodiment of the present invention in the context of video data that is compressed in accordance with a standard promulgated by the MPEG. While the embodiment is shown in the context of an MPEG standard, it should be noted that the present invention is not limited and can be used with video data that is compressed in accordance with other standards or uncompressed.

The circuit 200 receives pictures $I_0, B_1, B_2, B_3, P_4, B_5, B_6, B_7, P_8, \ldots$. The subscript indicates the order that the picture is presented for display. MPEG standards provide for the prediction of pictures from other pictures. MPEG standards provide for what are known as I pictures, P pictures, and B pictures.

I pictures (or Intra-pictures) are pictures that are not data dependent on other pictures. P pictures are pictures that are predicted from one other picture, wherein the other picture is displayed prior to the P picture (or Prediction Pictures). B pictures (or Bi-directional pictures) are pictures that are predicted from two other pictures, one that is presented for display prior to the B picture and the other that is presented for display after the B picture.

The arrows indicate the data dependencies of the pictures. For example, picture $P_4$ is predicted from $I_0$. Pictures $B_1$ $B_2$ and $B_3$ are predicted from $I_0$ and $P_4$. It is noted that pictures $B_1$ $B_2$ and $B_3$ are presented for display prior to picture $P_4$. However, because pictures $B_1$ $B_2$ and $B_3$ are data dependent on picture $P_4$, picture $P_4$ is decoded and decompressed prior to pictures $B_1$ $B_2$ and $B_3$.

Since pictures can be decoded and displayed at different times, a Decode Time Stamp (DTS) indicates the time when an associated video picture is to be decoded, while a Presentation Time Stamp indicates the time when an associated video picture is to be presented for display. Times indicated by PTS and DTS are evaluated with respect to the current System Time Clock value—locked to Program Clock Reference (PCR).

The pictures $I_0, B_1, B_2, B_3, P_4, B_5, B_6, B_7, P_8, \ldots$ are received by circuit 200 in decode order, e.g., $I_0, P_4, B_1, B_2, B_3, P_8, B_5, B_6, B_7, \ldots$. The foregoing forms what is known as a video sequence 205. The video sequence is packetized forming what is known as a packetized elementary stream 210.

The packetized elementary stream 210 includes headers 210h. The packetized elementary stream 210 is carried in transport packets 215 forming a transport stream TS. Presentation Time Stamps (PTS) and Decode Time Stamps (DTS) are carried in headers of the packetized elementary stream 210h.

The circuit 200 includes a transport processor 220, a video decoder 225, display engine 230, frame buffers 235, controller 240, a system time clock STC, comparator 245. The transport processor 220 receives and parses the transport stream TS.

The comparator 245 compares the DTS and PTS of the pictures to the system time clock STC. Based on the comparison, the controller 240 determines the appropriate picture to decode by the video decoder 225. When the video decoder 225 decodes the picture, the decoded pictures is written to the frame buffers 235. The frame buffers 235 store the decoded picture in the time between decoding and presentation, as well as for reference by the video decoder 225 when decoding other pictures that are dependent thereon. The controller 240 also determines the appropriate picture to display by the display engine 230. The display engine 230 outputs the pictures for display.

Although the controller 240, the video decoder 225, and display engine 230 are shown separate, it is noted that any combination of the controller 240, video decoder 225, and display engine 230 can be integrated. It is also noted that part of the controller 240 can be integrated with the video decoder 225 and/or part of the controller 240 can be integrated with the display engine 230.

The circuit 200 also provides fast-forward video output. During a fast-forward operation, the controller 240 causes the system time clock STC to increment at the product of the fast forward speed and the incrementation step. For example, for a 10× fast-forward operation, during each display period, the STC can be increased at a rate of 10 times the display period. As a result, the controller 240 causes the display engine 230 to output fast-forward video. In the foregoing manner, the fast-forward operation can be effectuated with accurate fast-forward resolution, especially over a large number of frames.

To avoid decoding the pictures at the fast-forwarded rate, in certain embodiments of the present invention, the controller 240 checks the pictures for pictures that are data independent of other pictures, such as I-pictures, and does not decode or present pictures that are data dependent, irrespective of the time stamps. When the PTS associated with the I-pictures are compared to the system time clock STC, the controller 240 can select the I-picture with the presentation time stamp that is nearest to the STC for display. Alternatively, the controller 240 can select the next picture that exceeds the STC for display. In the foregoing manner, the fast-forward operation can be effectuated with accurate fast-forward resolution, especially over a large number of frames.

Figure 3:
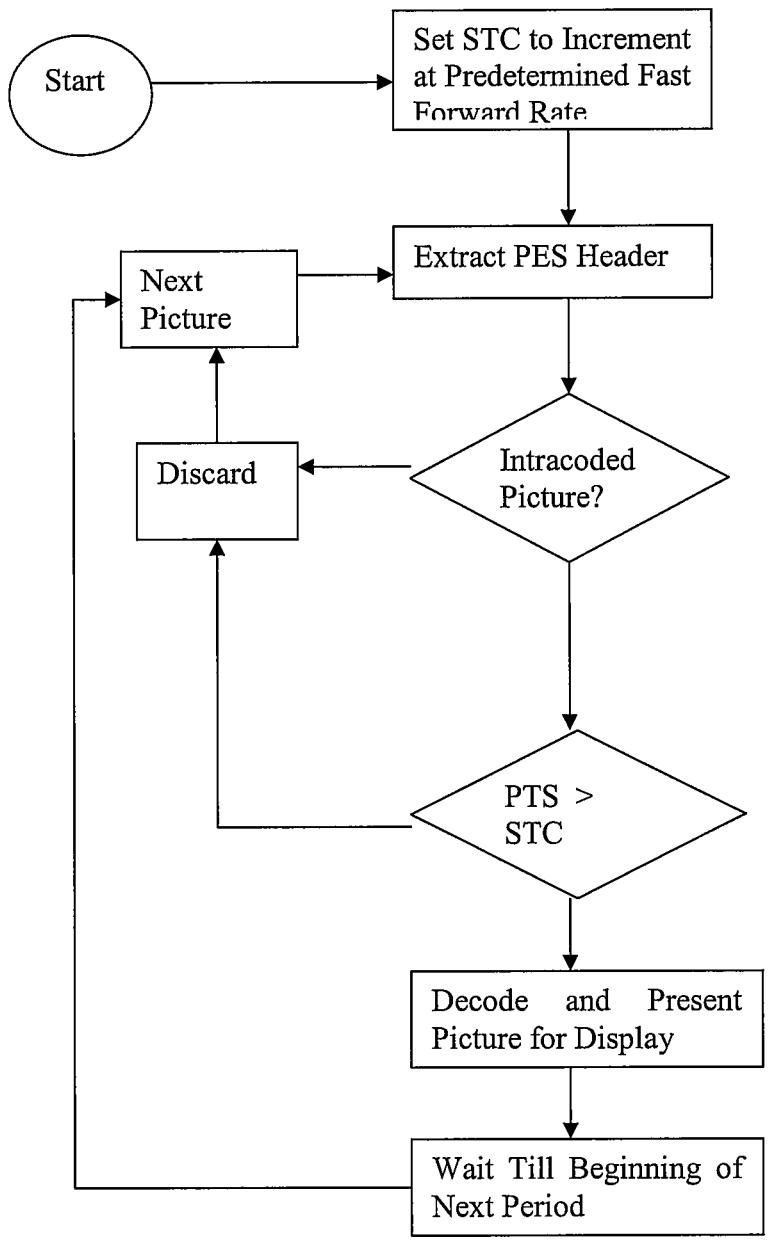
FIG. 3 is a flow diagram describing the operation of an MPEG decoder in accordance with an embodiment of the invention.

Referring now to FIG. 3, there is illustrated a flow diagram describing a method for fast-forwarding a video sequence. At 305, the controller 240 sets the system time clock STC to increment at a predetermined fast forward rate. At 310, the controller 240 extracts the PES header associated with a picture. The controller 240 makes a determination at 315, whether the picture is an intracoded picture. If the picture is not an intracoded picture, the controller 240 discards the picture at 320, selects the next picture at 325 and returns to 315.

If the picture is an intracoded picture, at 325, the controller 240 extracts the presentation time stamp associated with the picture. At 330, the comparator compares the presentation time stamp to the system time clock to determine if the presentation time stamp exceeds the system time clock. If at 330, the presentation time stamp does not exceed the system time clock, the controller 340 discards the picture at 320, selects the next picture at 325 and returns to 315.

If at 330, the presentation time stamp exceeds the system time clock, the controller 240 signals (at 335) the decoder 225 to decode the picture and the display engine 230 to output the decoded picture. The controller 240 then waits until the beginning of the next display period at 340. At the beginning of the next display period, the controller 240 returns to 325.

Figure 4:
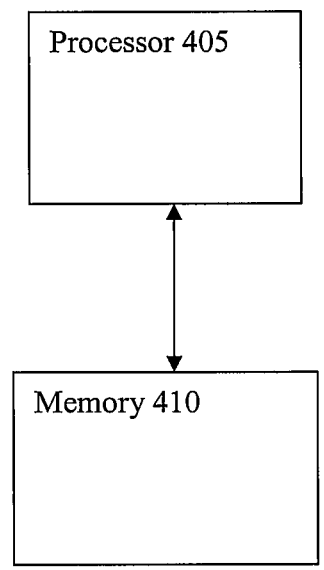
FIG. 4 is a block diagram of another exemplary circuit in accordance with an embodiment of the present invention.

Referring now to FIG. 4, there is illustrated a block diagram of an exemplary circuit in accordance with an embodiment of the present invention. The circuit 400 comprises a processor 405 and a memory 410 connected to the processor 405.

In certain embodiments of the present invention, the memory 410 can store a plurality of instructions for instructions effectuating, for example, the flow chart described in FIG. 3.

In certain embodiments, the processor 405 and memory 410 can be integrated onto a single integrated circuit. The memory 410 can comprise ROM, wherein the instructions are burned into the ROM as firmware.

In other embodiments, the processor 405 and the memory 410 can be board level components. The memory 410 can comprise, for example, a hard disc. The memory 410 can also comprises RAM. The hard disc can store the instructions. When the processor 405 executes the instructions, the RAM can store the instructions. In other embodiments, the memory 410 can be removable from the processor 405 and can include, for example, a floppy disc, or an optical disk.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of fast forwarding a video sequence, the method comprising:
    incrementing a value of a system time clock at a predetermined fast forward rate during a fast forward mode;
    during the fast forward mode, selecting from a plurality of intracoded pictures in the video sequence an intracoded picture having timing information nearest to the value of the system time clock but not exceeding the value of the system time clock; and
    displaying the selected intracoded picture.

2. The method of claim 1, wherein the timing information comprises presentation timing information.

3. The method of claim 1, further comprising repeatedly selecting the intracoded picture until the timing information of the intracoded picture exceeds the value of the system time clock.

4. The method of claim 1, further comprising not displaying a non-intracoded picture during the fast forward mode.

5. The method of claim 1, further comprising not displaying the intracoded picture during a portion of the fast forward mode when the timing information exceeds the value of the system time clock.

6. The method of claim 1, wherein the method is performed in a controller.

7. The method of claim 1, wherein the intracoded picture is displayed instead of another picture that has corresponding timing information that is closer to the value of the system time clock than the timing information for the intracoded picture.

8. A circuit that provides a fast forward video sequence, the circuit comprising:
- a system time clock comprising a value that is incremented at a predetermined fast forward rate during a fast forward mode;
- a comparator configured to compare the value of the system time clock with timing information associated with at least a portion of a plurality of pictures in a video sequence; and
- a controller configured to select, during the fast forward mode, an intracoded picture in the video sequence if the comparison indicates that the timing information does not exceed the value of the system time clock, wherein the controller is further configured to provide the selected intracoded picture to a decoder.

9. The circuit of claim 8, wherein the controller increments the value of the system time clock at the predetermined fast forward rate during the fast forward mode.

10. The circuit of claim 8, further comprising an extractor configured to extract the timing information from a header associated with the at least a portion of the pictures in the video sequence.

11. The circuit of claim 8, wherein the controller determines to display the intracoded picture if the timing information associated with the picture does not exceed the value of the system time clock and another intracoded picture does exceed the value of the system time clock.

12. The circuit of claim 8, further comprising a display engine, wherein the decoder is configured to decode the intracoded picture and to supply the decoded intracoded picture to the display engine, and wherein the display engine is configured to output the decoded intracoded picture until another picture is supplied by the decoder.

13. The circuit of claim 8, wherein the controller is further configured to repeatedly select the intracoded picture until the timing information of the intracoded picture exceeds the value of the system time clock.

14. The circuit of claim 8, wherein the controller is further configured to not display a non-intracoded picture during the fast forward mode.

15. The circuit of claim 8, wherein the controller is further configured to not display the picture during the fast forward mode if the picture is intracoded and the timing information associated with the picture exceeds the the value of the system time clock.

16. The circuit of claim 8, wherein the intracoded picture is displayed instead of another picture that has corresponding timing information that is closer to the value of the system time clock than the timing information for the intracoded picture.

17. A circuit that provides a fast forward video sequence, the circuit comprising:
- a controller;
- a memory connected to the controller, the memory storing a plurality of instructions executable by the controller, wherein execution of the instructions by the controller causes:
  - incrementing a value of a system time clock at a predetermined fast forward rate during a fast forward mode; and
  - selecting, during the fast forward mode, an intracoded picture from a plurality of intracoded pictures in the video sequence, the intracoded picture having timing information nearest to the value of the system time clock but not exceeding the value of the system time clock; and
  - displaying the selected intracoded picture during the fast forward mode.

18. The circuit of claim 17, wherein execution of the instructions further causes extracting the timing information from a header associated with the intracoded picture.

19. The circuit of claim 17, wherein the intracoded picture is displayed instead of another picture that has corresponding timing information that is closer to the value of the system time clock than the timing information for the intracoded picture.

20. The circuit of claim 17, wherein the timing information is a presentation time stamp.

21. The circuit of claim 17, wherein the intracoded picture is displayed instead of another picture that has corresponding timing information that is closer to the value of the system time clock than the timing information for the intracoded picture.

* * * * *